(12) United States Patent
Suzuki et al.

(10) Patent No.: US 10,100,882 B2
(45) Date of Patent: Oct. 16, 2018

(54) ONE-WAY CLUTCH

(71) Applicant: NSK-Warner K.K., Shinagawa-ku, Tokyo (JP)

(72) Inventors: Yukiyoshi Suzuki, Omaezaki (JP); Osamu Tanaka, Kikugawa (JP)

(73) Assignee: NSK-Warner K.K., Tokyo (JP)

( * ) Notice: Subject to any disclaimer, the term of this patent is extended or adjusted under 35 U.S.C. 154(b) by 0 days.

(21) Appl. No.: 15/361,398

(22) Filed: Nov. 26, 2016

(65) Prior Publication Data

US 2017/0184159 A1    Jun. 29, 2017

(30) Foreign Application Priority Data

Dec. 25, 2015    (JP) .................................. 2015-254025

(51) Int. Cl.
*F16D 41/07*    (2006.01)
*F16D 41/06*    (2006.01)

(52) U.S. Cl.
CPC ...... *F16D 41/07* (2013.01); *F16D 2041/0603* (2013.01); *F16D 2041/0605* (2013.01); *F16D 2300/10* (2013.01)

(58) Field of Classification Search
CPC ................ F16D 2041/0603; F16D 2041/0605
See application file for complete search history.

(56) References Cited

U.S. PATENT DOCUMENTS

| 2010/0051402 A1* | 3/2010 | Yamamoto | F16D 41/067 192/45.011 |
| 2013/0126290 A1* | 5/2013 | Parameswaran | F16D 15/00 192/45.001 |
| 2015/0068859 A1* | 3/2015 | Yamamoto | F16D 41/067 192/45.004 |

FOREIGN PATENT DOCUMENTS

| JP | S59-101021 U | 7/1984 |
| JP | 5405387 B2 | 2/2014 |

* cited by examiner

*Primary Examiner* — Jacob S. Scott
*Assistant Examiner* — Timothy Hannon
(74) *Attorney, Agent, or Firm* — Shapiro, Gabor and Rosenberger, PLLC

(57) ABSTRACT

A one-way clutch is disclosed, which improves durability while reducing a drag torque and restraining burning of a block bearing. The one-way clutch includes: a torque transfer mechanism disposed between an outer race 2 and an inner race 3 so disposed in the outer race 2 as to be spaced inwardly in a diametrical direction, and hindering the outer race 2 and the inner race 3 from making a relative rotation in a predetermined direction; and block bearings 6 disposed between the outer race 2 and the inner race 3 together with the torque transfer mechanism, and keeping the outer race 2 and the inner race 3 in a concentric state, in which each block bearing has a slide surface **6*f* contiguous with an axis-directional surface of the outer race 2 or the inner race 3, and at least part of the slide surface 6*f*** is a roughened surface.

1 Claim, 3 Drawing Sheets

ONE-WAY CLUTCH

This application claims priority to Japanese Patent Application No. 2015-254025, filed Dec. 25, 2015. The content of the above application is incorporated by reference in their entirety.

TECHNICAL FIELD

The present disclosure pertains to a one-way clutch used as a component for a torque transfer, a backstop and other equivalent purposes within a driving system of an automobile and an industrial machine and the like.

BACKGROUND ART

The one-way clutch is disposed between, e.g., an annular outer race and an annular inner race so disposed concentrically with the outer race as to be spaced inwardly of the outer race, and is configured to include a plurality of sprags hindering the outer race and the inner race from making a relative rotation in a predetermined direction by being engaged with an inner peripheral surface of the outer race and an outer peripheral surface of the inner race, retainers that retain the sprags, and spring that gives biasing forces to the sprags in such a direction as to be brought into engagement with the outer race and the inner race. With this configuration, the one-way clutch serves as a torque transfer mechanism, in which the inner race and the outer race rotate on idle relatively in one direction about a central axis but transfer a rotational torque in a reversed direction.

Exemplified as a one-way clutch used as a speed change mechanism in an automatic transmission for an automobile is a one-way clutch including annular end bearings having a bearing function in order to keep concentricity between the outer race and the inner race (e.g., Patent Document 1).

The one-way clutch using the end bearings is effective in decreasing lubricity for ensuring a lubrication oil, but produces a lubrication oil film in a peripheral direction on a bearing surface between the outer/inner races and the end bearings. The production of this lubrication oil film leads to a problem of causing a drag torque when rotating on idle as a viscous resistance of the oil. The drag torque when rotating on idle is part of a drive resistance of the automobile, and is an issue to be reduced by a clutch mechanism in terms of improving fuel consumption of the automobile and a contribution to the environment concerning $CO^2$ emission control.

Such being the case, there is made a proposal (e.g., Patent Document 2) for reducing the drag torque when rotating on idle by changing members exhibiting the bearing function to block bearings from the end bearings to thereby improve a shearing property of the lubrication oil film but decrease the viscous resistance owing to intermittent production of the lubrication oil film in the peripheral direction.

DOCUMENTS OF PRIOR ARTS

Patent Documents

[Patent Document 1] Japanese Utility Model Laid-Open Publication No. S59-101021

[Patent Document 2] Japanese Patent Publication No. 5405387

SUMMARY OF THE INVENTION

Problems to be Solved by the Invention

There exists, however, a problem that in an environment of high-speed revolutions exceeding a predetermined number of revolutions, the improvement of the shearing property of the lubrication oil film causes a shortage of the oil film and burning between the block bearings and slide surfaces at which the inner race and the outer race are contiguous therewith in an axial direction, resulting in a decline of durability of the one-way clutch.

A shape for ensuring the oil film to restrain the shortage of the oil film is provided, e.g., a groove and a dimple (hole) are provided in the slide surface of the block bearing, and this configuration raises a problem of increasing the drag torque due to an increased viscous resistance of the oil.

The slide surface of the block bearing is provided with the shape described above, and this configuration further raises concern about being unable to ensure bearing performance due to the burning caused by a rise of a bearing stress of the bearing surface.

It is an object of the present disclosure, which was devised in view of the problems described above, to provide a one-way clutch configured to improve durability by restraining burning of a block bearing while reducing a drag torque.

Problems to be Solved by the Invention

For solving the problems described above, the present disclosure provides a one-way clutch comprising:

a torque transfer mechanism being disposed between an outer race and an inner race so disposed in the outer race as to be spaced inwardly in a diametrical direction, and hindering the outer race and the inner race from making a relative rotation in a predetermined direction; and block bearings being disposed between the outer race and the inner race together with the torque transfer mechanism, and keeping the outer race and the inner race in a concentric state, each block bearing having a slide surface contiguous with an axis-directional surface of the outer race and/or a slide surface contiguous with an axis-directional surface of the inner race, at least a part of the slide surface being a roughened surface.

Preferably, a following condition is satisfied:

$0.20 \ \mu m \leq Ra \leq 1.75 \ \mu m$ where Ra denotes roughness of the slide surface.

Effect of the Invention

According to the present disclosure, it is feasible to ensure the oil film for restraining the burning on the slide surface of the block bearing at a level not affecting a decrease in drag torque, and to improve the durability of the one-way clutch by restraining the burning of the block bearings in an environment of high-speed revolutions.

EMBODIMENT FOR CARRYING OUT THE INVENTION

Figure 1:
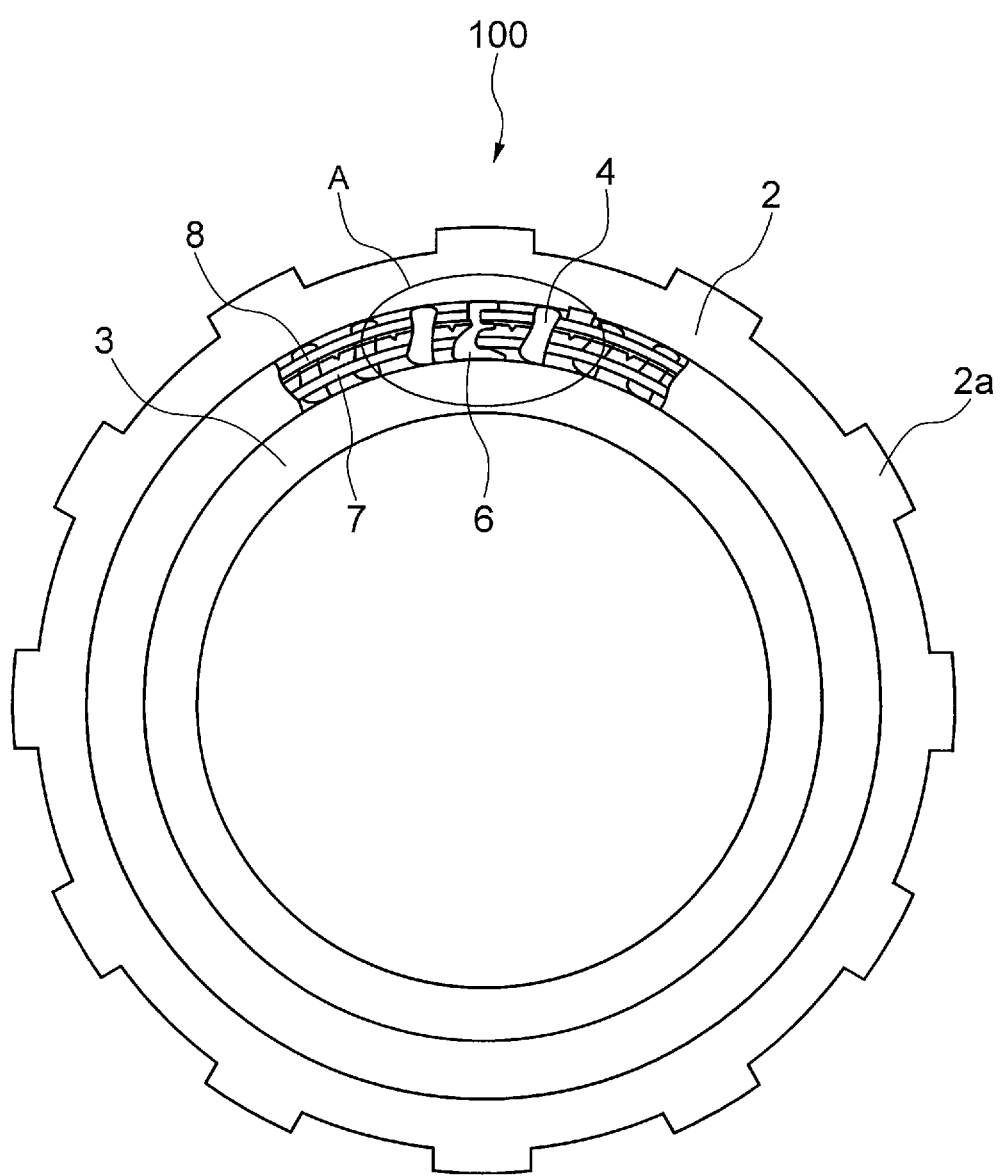
FIG. 1 is a front view of an assembly of a one-way clutch according to an embodiment of the present application and inner/outer races.
Figure 2:
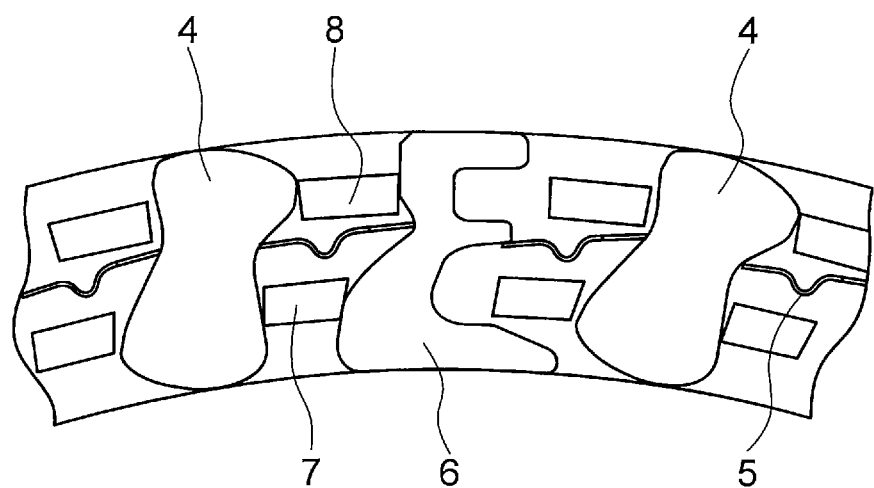
FIG. 2 is a partially enlarged view depicting in enlargement a portion A of the one-way clutch illustrated in FIG. 1 according to the embodiment of the present application.

An in-depth description of a one-way clutch according to an embodiment of the present application will hereinafter be made with reference to the drawings. FIG. 1 is a front view of an assembly 100 of the one-way clutch according to the embodiment of the present application and inner/outer races. FIG. 1 depicts only an upper portion between an outer race 2 and an inner race 3, while illustrations of other portions are omitted. FIG. 2 is a partially enlarged view depicting in enlargement a portion A of the one-way clutch illustrated in FIG. 1. Note that a "diametrical direction", a "peripheral direction" and an "axial direction" indicated a diametrical direction, a peripheral direction and an axial direction of the assembly 100 of the one-way clutch and the inner/outer races, unless otherwise specified in the present application.

The one-way clutch illustrated in FIG. 1 includes: a plurality of sprags 4 disposed between an annular outer race 2 and an annular inner race 3 so disposed as to be spaced inwardly in the diametrical direction of the outer race 2, for transferring torques by being engaged with the outer race 2 and the inner race 3; ribbon spring 5 that gives rising moments to the sprags 4 between the outer race 2 and the inner race 3; block bearings 6 each having a bearing function and concentrically retaining the outer race 2 and the inner race 3; an inner retainer (cage) 7 that retains the sprags 4 and the block bearings 6 between the inner race 3 and the ribbon spring 5; and an outer retainer (cage) 8 that retains the sprags 4 and the block bearings 6 between the outer race 2 and the ribbon spring 5.

The outer race 2 has twelve protrusions 2a protruding outwardly in the diametrical direction from an outside surface in the diametrical direction at equal intervals in the peripheral direction. The protrusion 2a has substantially the same dimension as a dimension of the outer race 2 in a depthwise direction (axial direction) as seen on the sheet of FIG. 1.

The inner race 3 is smaller in diameter than the outer race 2, and an outer peripheral surface of the inner race 3 is spaced from an inner peripheral surface of the outer race 2, thus forming an annular space between the outer race 2 and the inner race 3. The space between the outer race 2 and the inner race 3 accommodates a torque transfer mechanism configured to include the sprags 4 and the ribbon spring 5. A cavity penetrating in the axial direction is formed inwardly in the axial direction of the inner race 3.

The plurality of sprags 4, which are gourd-shaped members with central portions being narrowed as illustrated in FIG. 2, is disposed substantially at the equal intervals in the peripheral direction. The present embodiment exemplifies the torque transfer mechanism configured to hinder the outer race 2 and the inner race 3 from making a relative rotation by using the sprags 4 each taking the gourd-like shape and the ribbon spring 5; and, however, the present embodiment is applicable also to a one-way clutch using a torque transfer mechanism that employs cylindrical rollers for transferring the torque.

The ribbon spring 5 is disposed between the inner retainer 7 and the outer retainer 8. The ribbon spring 5 gives the rising moments to the sprags 4. To be specific, the ribbon spring 5 gives biasing forces of rotating the sprags 4 in such a direction that a longitudinal direction (the longitudinal direction in FIG. 1) of the sprag 4 gets close to the diametrical direction of the one-way clutch, and causing the sprags 4 to contact the inner peripheral surface of the outer race 2 and the outer peripheral surface of the inner race 3. The ribbon spring 5 has a plurality of openings provided in the peripheral direction and penetrating in the diametrical direction, and the sprag 4 and the block bearing 6 are disposed through the corresponding openings.

The plurality of block bearings 6 is disposed substantially at the equal intervals in the peripheral direction, and keeps a distance between the outer race 2 and the inner race 3 to retain the outer race 2 and the inner race 3 in a concentric state. An in-depth description of the block bearing 6 will be made later on.

The inner retainer 7 takes substantially a cylindrical shape and has a plurality of openings penetrating in the diametrical direction and disposed in the peripheral direction. The inner retainer 7 is disposed between the ribbon spring 5 and the inner race 3. The sprags 4 and the block bearings 6 are disposed through these openings. The inner retainer 7 restricts movements of diametrically-inner portions of the sprags 4 and the block bearings 6.

The outer retainer 8 takes substantially cylindrical shape with its diameter being larger than the diameter of the inner retainer 7, and has a plurality of openings penetrating in the diametrical direction and provided in the peripheral direction. The outer retainer 8 is disposed between the outer race 2 and the ribbon spring 5. The sprags 4 and the block bearings 6 are disposed through the corresponding openings of the outer retainer 8. The same number of the sprags 4 are disposed respectively between the neighboring block bearings 6 in the peripheral direction. The outer retainer 8 restricts movements of diametrically-outer portions of the sprags 4 and the block bearings 6.

Figure 3:
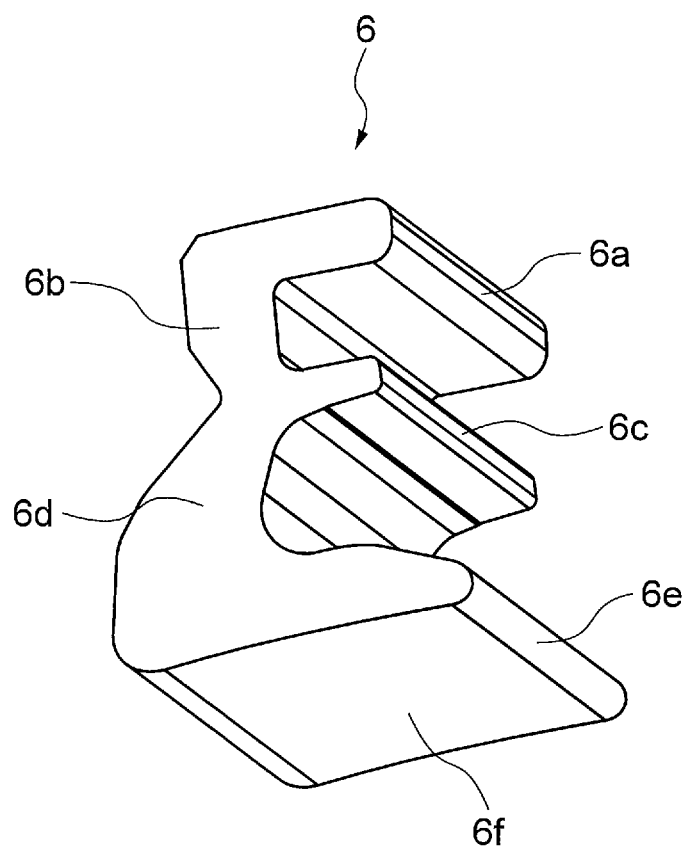
FIG. 3 is a perspective view illustrating a block bearing according to the embodiment of the present application.

FIG. 3 is a perspective view illustrating the block bearing 6 according to the embodiment.

The block bearing 6 is configured integrally by including, sequentially from the outer portion in the diametrical direction (from above on the drawing), a first protruded portion 6a taking a plate-like shape extending in the peripheral direction and the axial direction; a first connective portion 6b extending inward in the diametrical direction from one end of the first protruded portion 6a in the peripheral direction and over an entire length thereof in the axial direction; a second protruded portion 6c extending in the same peripheral direction as the first protruded portion 6a from an inward portion of the first connective portion 6b in the diametrical direction and over an entire length thereof in the axial direction; a second connective portion 6d extending inward in the diametrical direction from a part of the second protruded portion 6c on the same side as the first connective portion 6b and over an entire length thereof in the axial direction; and a third protruded portion 6e extending in the same peripheral direction as those of the first and second protruded portions 6a, 6c from an inward portion of the second connective portion 6d in the diametrical direction and over an entire length thereof in the axial direction. The first protruded portion 6a extends in the peripheral direction longer than the second protruded portion 6c, and the third protruded portion 6e extends in the peripheral direction longer than the first protruded portion 6a. The first protruded portion 6a, the first connective portion 6b, the second protruded portion 6c, the second connective portion 6d and the third protruded portion 6e are equalized in their dimensions in the axial direction. The block bearing 6 takes a flat shape being substantially vertical to the axial direction on both of a front surface side and a rear surface side of the one-way clutch. The block bearing 6 can be made of an oil-impregnated sintered metal.

An inward surface of the third protruded portion 6e in the diametrical direction is a slide surface 6f contiguous with an axis-directional surface of the outer peripheral surface of the inner race 3. The slide surface 6f is roughened by an additional work. A working method for forming roughness is not particularly limited, and the roughness can be formed by every generally known working method such as cutting and barreling.

It is preferable that surface roughness Ra of the slide surface 6f satisfies a conditional expression "0.20 µm≤Ra≤1.75 µm". Burning occurs when the surface roughness Ra takes a numerical value that is smaller than "0.20 µm", and other shapes of the block bearing 6 are deformed in terms of a forming work, resulting in being easy to become deficient of strength. Further, dimensional accuracy cannot be ensured.

Shown next are results of an evaluation test of the one-way clutch according to the embodiment. Table 1 given below shows conditions of the evaluation test.

TABLE 1

| Test Name | Idling Durability Test |
|---|---|
| Tester | Idling Durability Tester |
| Revolutions Per Minute (rpm) | 6.250 |
| Lubrication (Axial Center: ml/min) | 80 |
| Oil Temperature (° C.) | 120 |
| Test Time (h) | 3 |

Table 2 given below shows test results in comparison with a conventional product. The one-way clutch after being tested was checked by determining whether there is any problem about states of the bearing function of the block bearings 6 and the function of the one-way clutch.

An abrasion quantity of the slide surface 6f about the block bearing 6 was checked as a concrete criterion for the determination. A limit value was set to "0.062 mm" as a threshold value of the abrasion quantity. A rollover torque defined as one of functional assurances of the one-way clutch decreases because of becoming axis eccentricity when over this numerical value, and hence the functions of the one-way clutch get unfulfilled. Further, it was visually checked whether or not the burning in external appearance occurred on the slide surface 6f of the block bearing 6. Criteria for determination is that the condition is unacceptable when the burning is confirmed on the slide surface 6f but is preferable whereas when not confirmed. Note that the numerical values were given as maximum values when the test count N=5 with respect to the conventional product and the present embodiment.

TABLE 2

| | Conventional Product | Present Embodiment |
|---|---|---|
| Abrasion Quantity on Slide Surface (mm) | 0.185 | 0.009 |
| Burning On External Appearance | Burning Occurred | Burning Not Occurred |

It is understood from Table 2 that the abrasion quantity of the slide surface 6f is within a range not affecting the functions with no burning on the external appearance, and hence the one-way clutch according to the embodiment has effects.

As described above, according to the present embodiment, it is feasible to provide the one-way clutch reducing the drag torque and having the improved durability while restraining the burning of the block bearings 6.

It should be noted that the embodiment of the present application can be modified and improved in a variety of forms without being limited to the embodiment discussed above. For example, according to the present embodiment, the slide surface 6f of the block bearing 6 slides on the outer peripheral surface of the inner race 3, but the block bearing 6 can be also configured to slide on the inner peripheral surface of the outer race 2. The block bearing 6 can be further configured to slide on both of the outer peripheral surface of the inner race 3 and the inner peripheral surface of the outer race 2. In any case, it may be sufficient that the slide surface is configured as the roughened surface.

It is desirable that the overall slide surface 6f of the block bearing 6 is configured as the roughened surface; and, however, a part of the slide surface 6f can be configured as the roughened surface.

DESCRIPTION OF THE REFERENCE NUMERALS AND SYMBOLS 100 assembly of one-way clutch and inter/outer races
2 outer race
2a protrusion
3 inner race
4 sprag
5 ribbon spring
6 block bearing
6a first protruded portion
6b first connective portion
6c second protruded portion
6d second connective portion
6e third protruded portion
6f slide surface
7 inner retainer
8 outer retainer

What is claimed is:

1. A one-way clutch comprising:
a torque transfer mechanism being disposed between an outer race and an inner race so disposed in the outer race as to be spaced inwardly in a diametrical direction, and hindering the outer race and the inner race from making a relative rotation in a predetermined direction; and
block bearings being disposed between the outer race and the inner race together with the torque transfer mechanism, and keeping the outer race and the inner race in a concentric state,
each block bearing having at least one of a slide surface contiguous with an axis-directional surface of the outer race and a slide surface contiguous with an axis-directional surface of the inner race,
at least part of the at least one slide surface being a roughened surface which satisfies the following condition:

0.20 µm≤Ra≤1.75 µm where Ra denotes roughness of the roughened surface.

* * * * *